US012639101B2

(12) United States Patent
Hayes et al.

(10) Patent No.: US 12,639,101 B2
(45) Date of Patent: *May 26, 2026

(54) TRANSACTION INTERLOCKS FOR A DISTRIBUTED SYSTEM

(71) Applicant: PURE STORAGE, INC., Santa Clara, CA (US)

(72) Inventors: John Hayes, Mountain View, CA (US); Brian Gold, Los Altos, CA (US); Shantanu Gupta, Santa Clara, CA (US); Robert Lee, Pebble Beach, CA (US); Hari Kannan, Sunnyvale, CA (US)

(73) Assignee: EVERPURE, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/022,927

(22) Filed: Jan. 15, 2025

(65) Prior Publication Data

US 2025/0156215 A1 May 15, 2025

Related U.S. Application Data

(63) Continuation of application No. 17/552,606, filed on Dec. 16, 2021, now Pat. No. 12,282,799, which is a
(Continued)

(51) Int. Cl.
*G06F 16/00* (2019.01)
*G06F 3/06* (2006.01)
(Continued)

(52) U.S. Cl.
CPC ............ *G06F 9/466* (2013.01); *G06F 3/0619* (2013.01); *G06F 3/0656* (2013.01);
(Continued)

(58) Field of Classification Search
CPC ...................................................... G06F 16/10
(Continued)

(56) References Cited

U.S. PATENT DOCUMENTS

| 6,542,645 | B1 | 4/2003 | Silverbrook et al. |
| 7,386,674 | B1 | 6/2008 | Lango |

(Continued)

FOREIGN PATENT DOCUMENTS

| CN | 101506766 A | 8/2009 |
| CN | 101650972 A | 2/2010 |

(Continued)

OTHER PUBLICATIONS

Extended European Search Report for European Application No. 16797310.6, mailed Nov. 29, 2018, 10 Pages.

(Continued)

*Primary Examiner* — Chelcie L Daye

(57) ABSTRACT

A method for a transactional commit in a storage unit is provided. The method includes receiving a logical record from a storage node into a transaction engine of a storage unit of the storage node and writing the logical record into a data structure of the transaction engine. The method includes writing, to a command queue of the transaction engine, an indication to perform an atomic update using the logical record and transferring each portion of the logical record from the data structure of the transaction engine to non-persistent memory of the storage unit as a committed transaction. A storage unit for a storage system is also provided.

20 Claims, 8 Drawing Sheets

160

Related U.S. Application Data continuation of application No. 16/200,310, filed on Nov. 26, 2018, now Pat. No. 11,231,956, which is a continuation of application No. 14/716,543, filed on May 19, 2015, now Pat. No. 10,140,149.

(51) Int. Cl.

| | |
|---|---|
| *G06F 9/46* | (2006.01) |
| *G06F 12/0802* | (2016.01) |
| *G06F 12/0868* | (2016.01) |
| *G06F 13/16* | (2006.01) |
| *G06F 16/10* | (2019.01) |

(52) U.S. Cl.
CPC ............ *G06F 3/0688* (2013.01); *G06F 9/467* (2013.01); *G06F 12/0802* (2013.01); *G06F 12/0868* (2013.01); *G06F 13/16* (2013.01); *G06F 16/10* (2019.01); *G06F 2212/1032* (2013.01); *G06F 2212/152* (2013.01); *G06F 2212/214* (2013.01); *G06F 2212/222* (2013.01); *G06F 2212/261* (2013.01)

(58) Field of Classification Search
USPC .......................................................... 707/615
See application file for complete search history.

(56) References Cited

U.S. PATENT DOCUMENTS

| | | | |
|---|---|---|---|
| 8,484,259 | B1 | 7/2013 | Makkar et al. |
| 8,826,273 | B1 | 9/2014 | Chen |
| 9,275,063 | B1 | 3/2016 | Natanzon |
| 9,910,742 | B1 | 3/2018 | Faibish et al. |
| 10,185,495 | B2 | 1/2019 | Katsuki |
| 10,831,720 | B2 | 11/2020 | Mainali et al. |
| 11,294,588 | B1 | 4/2022 | Miller et al. |
| 12,235,730 | B1 | 2/2025 | Kumar et al. |
| 2004/0215619 | A1* | 10/2004 | Rabold ................... G06F 16/10 |
| 2006/0250640 | A1 | 11/2006 | Lapstun et al. |
| 2010/0191713 | A1 | 7/2010 | Lomet et al. |
| 2010/0306444 | A1 | 12/2010 | Shirley et al. |
| 2013/0097136 | A1 | 4/2013 | Goldberg |
| 2013/0198447 | A1* | 8/2013 | Yochai ................ G06F 12/0866 |
| | | | 711/E12.019 |

| | | | |
|---|---|---|---|
| 2014/0075086 | A1 | 3/2014 | Banikazemi et al. |
| 2014/0281269 | A1 | 9/2014 | Chakrabarti et al. |
| 2014/0344503 | A1 | 11/2014 | Deguchi et al. |
| 2015/0347523 | A1 | 12/2015 | Patel et al. |
| 2016/0118121 | A1* | 4/2016 | Kelly ........................ G06F 1/30 |
| | | | 710/301 |
| 2016/0142485 | A1 | 5/2016 | Mitkar et al. |
| 2017/0091169 | A1 | 3/2017 | Bellegarda et al. |
| 2017/0155713 | A1 | 6/2017 | Powell et al. |
| 2017/0185643 | A1 | 6/2017 | Doshi et al. |
| 2018/0074748 | A1 | 3/2018 | Makin et al. |
| 2018/0081562 | A1 | 3/2018 | Vasudevan |
| 2019/0370360 | A1 | 12/2019 | Mainali et al. |
| 2019/0370362 | A1 | 12/2019 | Mainali et al. |
| 2019/0370365 | A1 | 12/2019 | Chalakov et al. |
| 2020/0014688 | A1 | 1/2020 | Kohli et al. |
| 2022/0012172 | A1 | 1/2022 | Ostrovsky et al. |
| 2022/0156114 | A1 | 5/2022 | Nagpal et al. |
| 2022/0222004 | A1 | 7/2022 | Miller et al. |
| 2022/0261445 | A1 | 8/2022 | Gentilcore et al. |
| 2023/0144662 | A1 | 5/2023 | Tasinga et al. |
| 2025/0007918 | A1 | 1/2025 | Helmick et al. |

FOREIGN PATENT DOCUMENTS

| | | |
|---|---|---|
| CN | 102187321 A | 9/2011 |
| CN | 102282548 A | 12/2011 |
| CN | 103814354 A | 5/2014 |
| CN | 104583989 A | 4/2015 |
| JP | 2008097155 A | 4/2008 |
| WO | WO-2014142908 A1 | 9/2014 |

OTHER PUBLICATIONS

Frakes Dan, "Up close with Mountain Lion: Power Nap (Frakes, Dan, Working Mac—Up close with Mountain Lion: Power Nap, Macworld.com," Aug. 1, 2012, pp. 1-6.

Liu Yangfan, "Hardware Transactional Storage Micro-Architecture and its Verification Research," Chinese Ph.D. Dissertation Full-text Database Information Technology Series, pp. 1137-2.

Yao Ming, "Design and Implementation of High-Density and High-Speed Storage System," China Excellent Master's Thesis Full-text Database Information Technology Series, pp. 1137-1177.

* cited by examiner

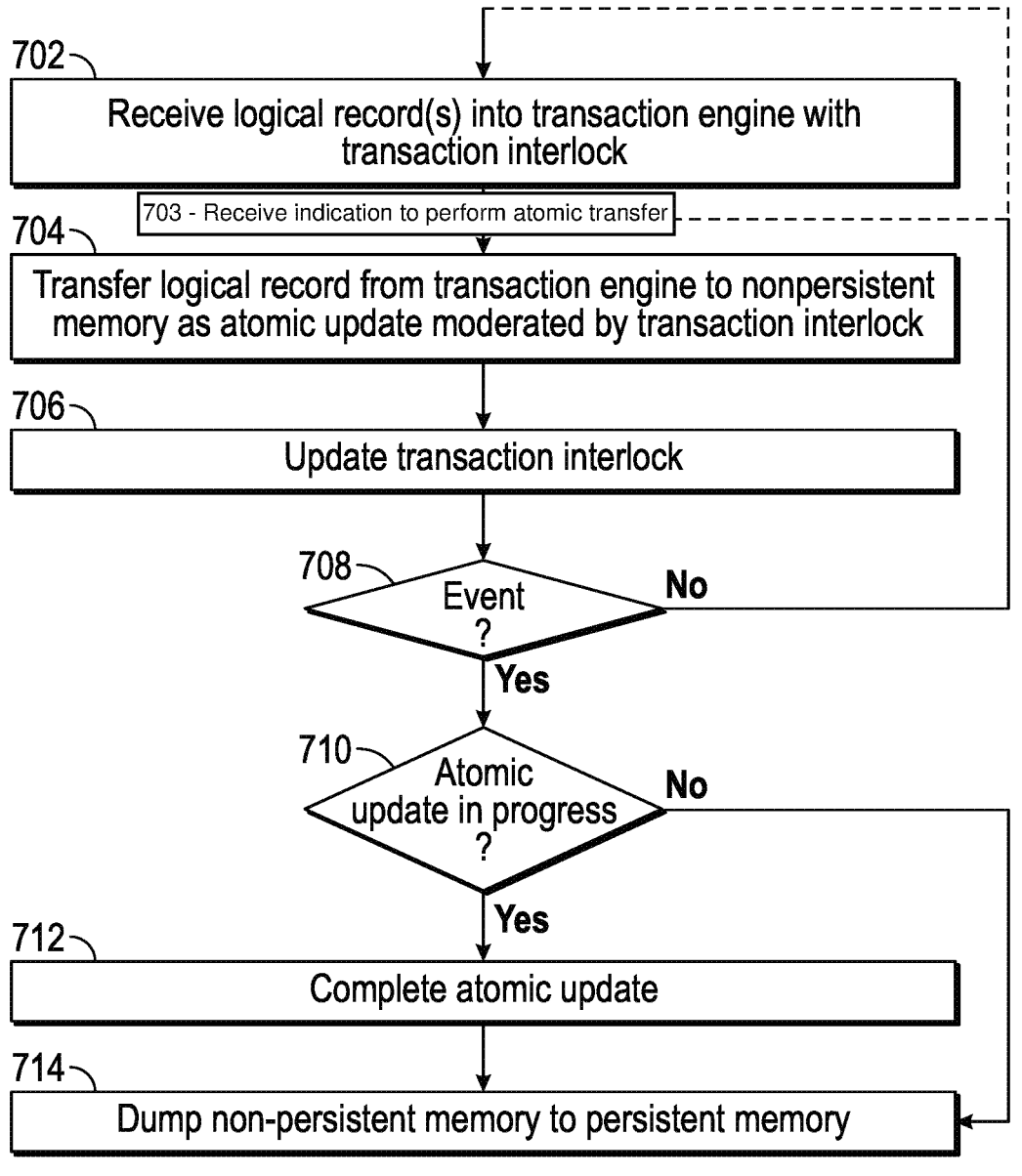

702 — Receive logical record(s) into transaction engine with transaction interlock 703 - Receive indication to perform atomic transfer 704 — Transfer logical record from transaction engine to nonpersistent memory as atomic update moderated by transaction interlock 706 — Update transaction interlock 708 — Event ? — No Yes 710 — Atomic update in progress ? — No Yes 712 — Complete atomic update 714 — Dump non-persistent memory to persistent memory

FIG. 7

TRANSACTION INTERLOCKS FOR A DISTRIBUTED SYSTEM

CROSS REFERENCE TO RELATED APPLICATIONS

This application is a continuation application for patent entitled to a filing date and claiming the benefit of earlier-filed U.S. patent application Ser. No. 17/552,606, filed Dec. 16, 2021, which is a continuation application of U.S. patent application Ser. No. 16/200,310, filed Nov. 26, 2018, issued as U.S. Pat. No. 11,231,956 on Jan. 25, 2022, which is a continuation application of U.S. patent application Ser. No. 14/716,543, filed May 19, 2015, issued as U.S. Pat. No. 10,140,149 on Nov. 27, 2018, all of which are hereby incorporated herein by reference in their entirety.

BACKGROUND

Storage clusters and other storage systems store user data in various types of storage memory, such as hard drives, tapes, and solid-state storage. Some storage systems use a pipelined architecture, in which data is written to volatile memory and later transferred from volatile memory to nonvolatile memory, or from non-persistent memory to persistent memory. This may allow additional processing, or take advantage of differences in write speeds or write latency of various types of memory. Defining data coherency mechanisms in storage systems, so as to allow for data recovery in case of power failure, operating system or application crashes, poses challenges, some of which are general and some of which are unique to system architecture.

It is within this context in which various embodiments arise.

SUMMARY

In some embodiments, a storage unit for a storage system is provided. The storage unit includes non-persistent memory and persistent memory. The storage unit includes a transaction engine, configured to receive logical records and configured to transfer the logical records to the non-persistent memory as atomic updates. Each of the atomic updates constitutes a transfer of a logical record to the non-persistent memory.

In some embodiments, a method for a transactional commit in a storage unit is provided. The method includes receiving a logical record from a storage node into a transaction engine of a storage unit of the storage node and writing the logical record into a data structure of the transaction engine. The method includes writing, to a command queue of the transaction engine, an indication to perform an atomic update using the logical record and transferring each portion of the logical record from the data structure of the transaction engine to non-persistent memory of the storage unit as a committed transaction.

In some embodiments, a storage system is provided. The storage system includes a plurality of storage nodes coupled as a storage cluster. Each of the plurality of storage nodes has one or more storage units and each storage unit has non-persistent memory, persistent memory, and a transaction engine with a transaction interlock configured to assure coherency of an atomic update. The transaction engine and the transaction interlock of each storage unit are configured to transfer logical records from the transaction engine with the transaction interlock to the non-persistent memory with each logical record transferred as the atomic update interlocked by the transaction interlock.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 7 is a flow diagram of a method for a transactional commit in a storage unit, which can be practiced on or using embodiments of the storage unit of FIGS. 4-6.

DETAILED DESCRIPTION

Figure 1:
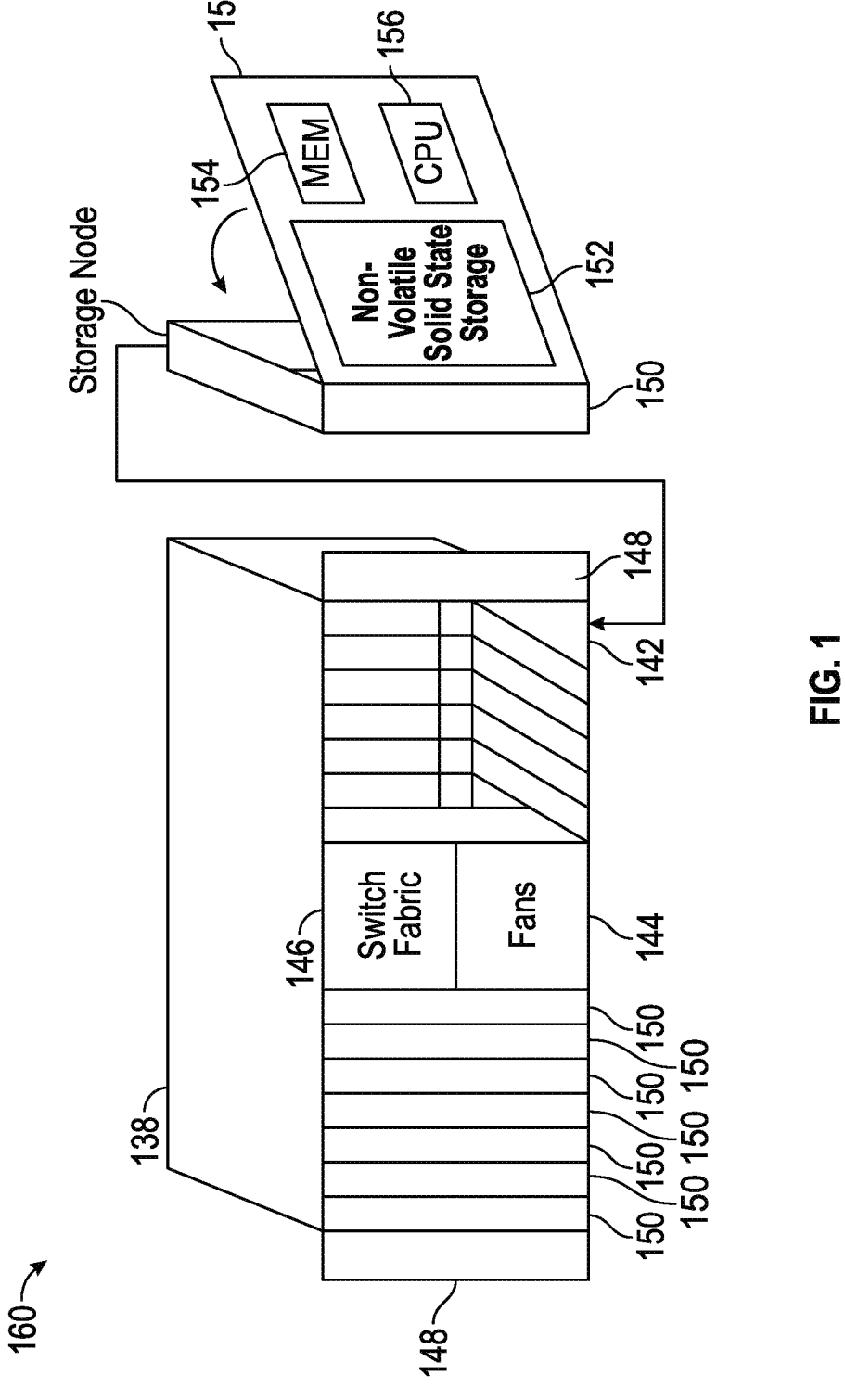
FIG. 1 is a perspective view of a storage cluster with multiple storage nodes and internal storage coupled to each storage node to provide network attached storage, in accordance with some embodiments.

Embodiments of a storage cluster are described below, with reference to FIGS. 1-3. Some embodiments have a transaction engine in a storage unit, which provides data coherency for atomic transfers of logical records, as described with reference to FIGS. 4-7. The embodiments below describe a storage cluster that stores user data, such as user data originating from one or more user or client systems or other sources external to the storage cluster. The storage cluster distributes user data across storage nodes housed within a chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster is contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as Peripheral Component Interconnect (PCI) Express, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system (NFS), common internet file system (CIFS), small computer system interface (SCSI) or hypertext transfer protocol (HTTP). Translation from the client protocol may occur at the switch, chassis external communication bus or within each storage node.

Each storage node may be one or more storage servers and each storage server is connected to one or more non-volatile solid state memory units, which may be referred to as storage units. One embodiment includes a single storage server in each storage node and between one to eight non-volatile solid state memory units, however this one example is not meant to be limiting. The storage server may include a processor, dynamic random access memory (DRAM) and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded central processing unit (CPU), solid state storage controller, and a quantity of solid state mass storage, e.g., between 2-32 terabytes (TB) in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory (MRAM) that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

FIG. 1 is a perspective view of a storage cluster 160, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 160, each having one or more storage nodes 150, in a flexible and reconfigurable arrangement of both the physical components and the amount of storage memory provided thereby. The storage cluster 160 is designed to fit in a rack, and one or more racks can be set up and populated as desired for the storage memory. The storage cluster 160 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in FIG. 1, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 158 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 1, storage cluster 160 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2:
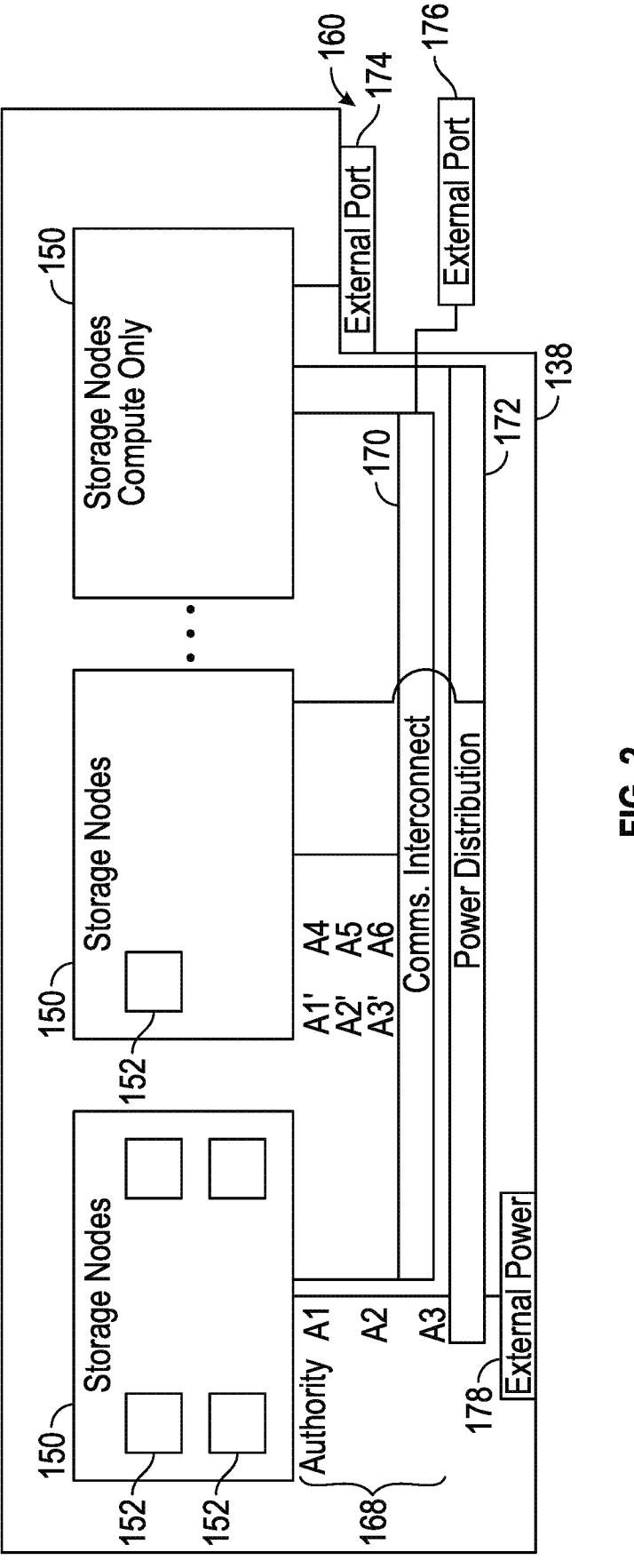
FIG. 2 is a block diagram showing an interconnect switch coupling multiple storage nodes in accordance with some embodiments.

FIG. 2 is a block diagram showing a communications interconnect 170 and power distribution bus 172 coupling multiple storage nodes 150. Referring back to FIG. 1, the communications interconnect 170 can be included in or implemented with the switch fabric 146 in some embodiments. Where multiple storage clusters 160 occupy a rack, the communications interconnect 170 can be included in or implemented with a top of rack switch, in some embodiments. As illustrated in FIG. 2, storage cluster 160 is enclosed within a single chassis 138. External port 176 is coupled to storage nodes 150 through communications interconnect 170, while external port 174 is coupled directly to a storage node. External power port 178 is coupled to power distribution bus 172. Storage nodes 150 may include varying amounts and differing capacities of non-volatile solid state storage 152 as described with reference to FIG. 1. In addition, one or more storage nodes 150 may be a compute only storage node as illustrated in FIG. 2. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 1 and 2, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space.

Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIG. 5) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check (LDPC) code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudorandomly assigning entities to authorities, by splitting entities into ranges based upon an externally produced key, or by placing a single entity into each authority.

Examples of pseudorandom schemes are linear hashing and the Replication Under Scalable Hashing (RUSH) family of hashes, including Controlled Replication Under Scalable Hashing (CRUSH). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being replicated. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Storage clusters 160, in various embodiments as disclosed herein, can be contrasted with storage arrays in general. The storage nodes 150 are part of a collection that creates the storage cluster 160. Each storage node 150 owns a slice of data and the computing required for providing the data. Multiple storage nodes 150 are required to cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 160, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 3:
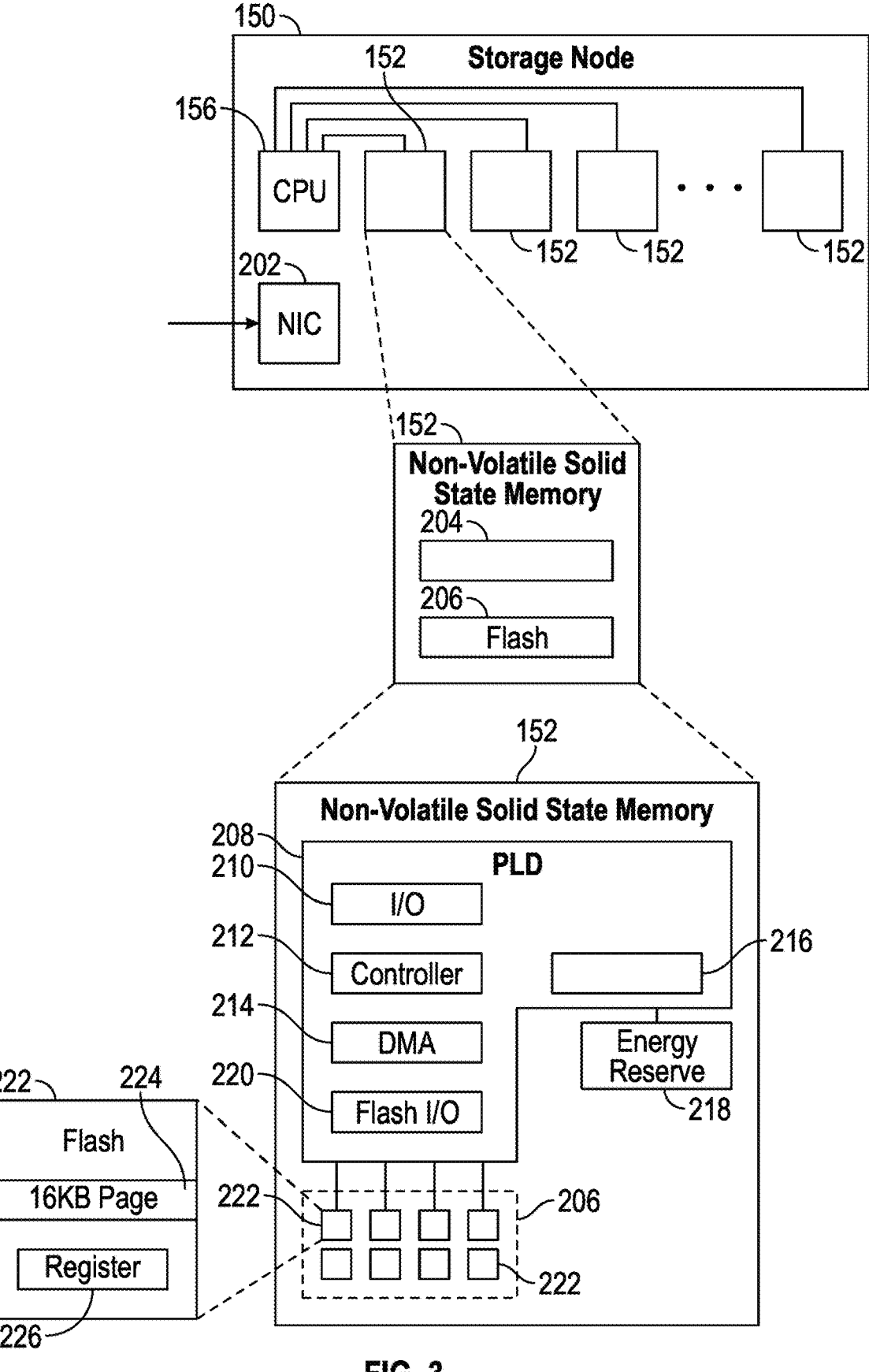
FIG. 3 is a multiple level block diagram, showing contents of a storage node and contents of one of the non-volatile solid state storage units in accordance with some embodiments.

FIG. 3 is a multiple level block diagram, showing contents of a storage node 150 and contents of a non-volatile solid state storage 152 of the storage node 150. Data is communicated to and from the storage node 150 by a network interface controller (NIC) 202 in some embodiments. Each storage node 150 has a CPU 156, and one or more non-volatile solid state storage 152, as discussed above. Moving down one level in FIG. 3, each non-volatile solid state storage 152 has a relatively fast non-volatile solid state memory, such as nonvolatile random access memory (NVRAM) 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 5, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device (PLD) 208, e.g., a field programmable gate array (FPGA). In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 160, in various embodiments as disclosed herein, can be contrasted with storage arrays in general. The storage nodes 150 are part of a collection that creates the storage cluster 160. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 160, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 4:
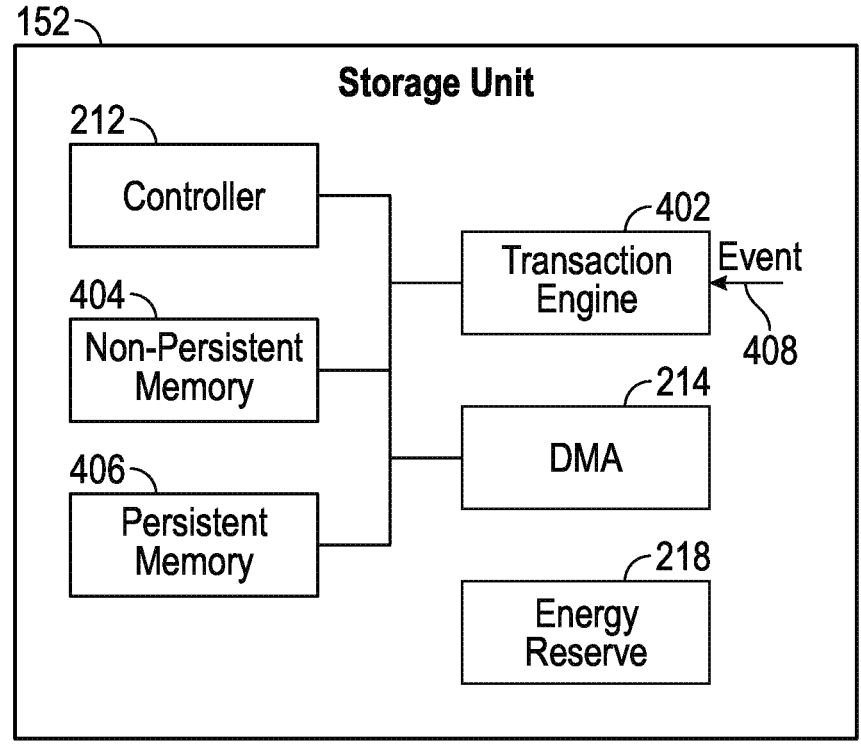
FIG. 4 is a block diagram of an embodiment of a non-volatile solid-state storage unit storage unit with a transaction engine that provides an interlock for atomic updates.
Figure 5:
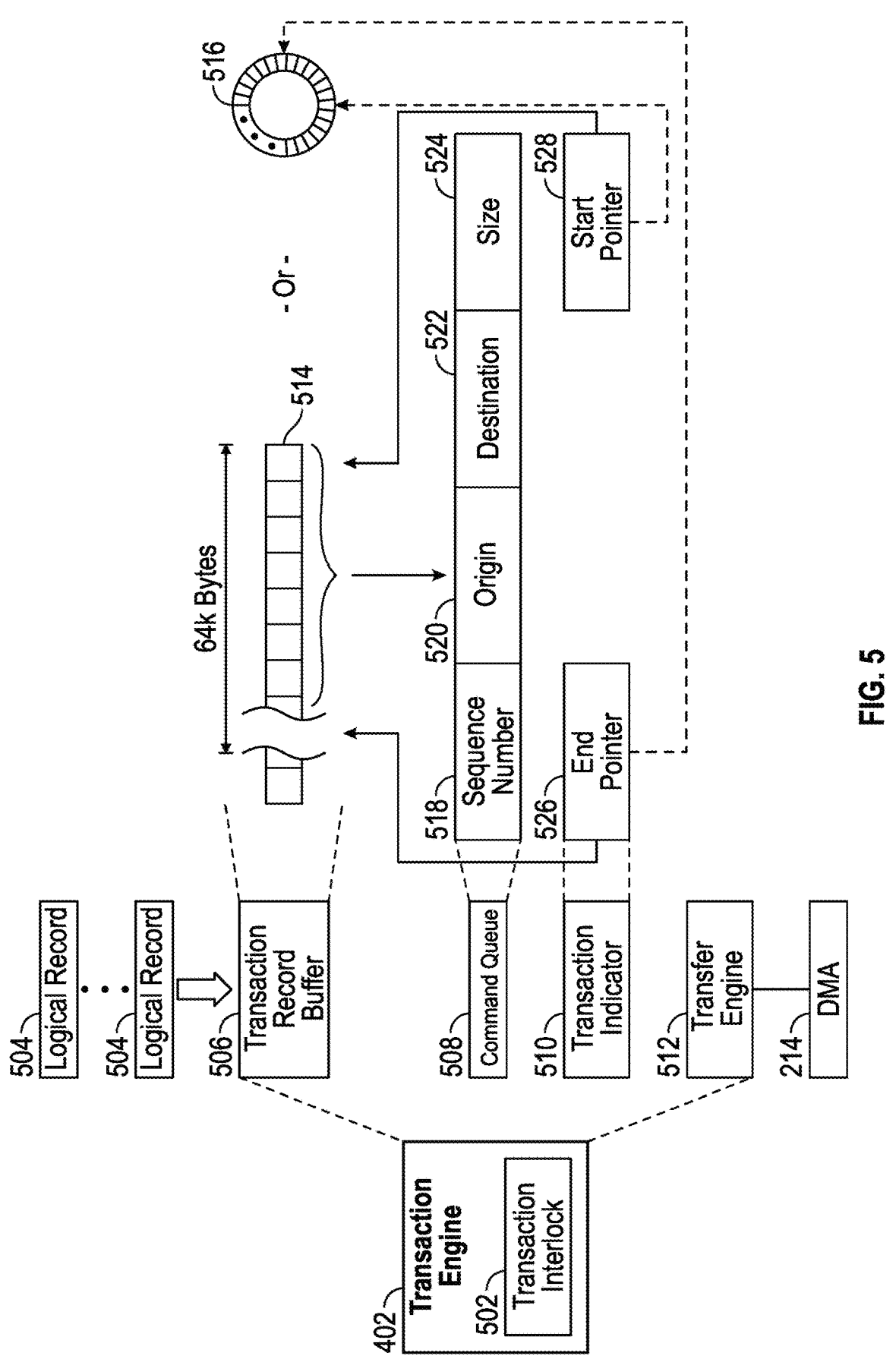
FIG. 5 is a block diagram of an embodiment of the transaction engine of FIG. 4, showing a transaction interlock.

FIGS. 4-7 illustrate various embodiments of a storage unit 152 that has a transaction engine 402, which provides data coherency for atomic transfers of logical records. It is desirable that an atomic transfer of a logical record be completed even if there is an event, such as power loss or interruption, an operating system crash, a software application crash, or another event impacting data coherency mechanisms. The transaction engine 402 has a transaction interlock 502, which acts as an interlock or lockout mechanism, i.e., an interlock for transactions, for each atomic update, which is a transfer of a complete logical record. This mechanism prevents the possibility of loss of coherency to a logical record at various locations in the storage unit 152, as might otherwise occur in the above-described events. Architecture of one embodiment of the storage unit is described with reference to FIG. 4. Details of an embodiment of the transaction engine 402 are shown in FIG. 5. An operating scenario and various actions occurring in a storage unit 152 are described with reference to FIG. 6.

FIG. 4 is a block diagram of an embodiment of a non-volatile solid-state storage unit storage unit 152 with a transaction engine 402 that provides an interlock for atomic updates. Various components of the transaction engine 402 in the storage unit 152 interact with the controller 212 (see also FIG. 3), and can be implemented in software, hardware, firmware or combinations thereof. Some of these components can be implemented in memory (e.g., buffers, queues, pointers, data structures) such as the non-persistent memory 404 and/or registers or memory resident in the controller 212, etc. The non-persistent memory 404 can be implemented with the NVRAM 204, the DRAM 216, or other RAM or memory that does not persist or retain data for long periods of time. The persistent memory 406 can be implemented with flash memory 206 or other memory that does persist or retain data for long periods of time. A DMA unit 214 and an energy reserve 218 are included in the storage unit 152 (see also FIG. 3), in some embodiments. The controller 212 sends logical records (e.g., data, which will be further described with reference to FIG. 6) to the transaction engine 402. The transaction engine 402 transfers each logical record to non-persistent memory 404, applying a transaction interlock 502 (which will be further described with reference to FIG. 5).

In case of an event, an event input 408 (e.g., a status input, an interrupt input, a port bit, etc.) to the transaction engine 402 informs the transaction engine 402 to complete any atomic update in progress. Then, the DMA unit 214 copies the contents of the non-persistent memory 404 to the persistent memory 406. These actions are supported by the energy reserve 218, which stores sufficient electrical power to allow these operations to complete. The energy reserve 218 thus provides power to a power loss hold up domain. During recovery, after the event, the storage unit 152 has a coherent image in the persistent memory 406 of the last atomic update, and can rely on this not being corrupted. Were it not for the transaction interlock 502, it might be possible to have a portion of a logical record missing and not have any indication that this is so.

FIG. 5 is a block diagram of an embodiment of the transaction engine 402 of FIG. 4, showing a transaction interlock 502. In various embodiments, the transaction interlock 502 could be part of the transaction engine 402, or could be separate from and coupled to the transaction engine 402. The transaction engine 402 and transaction interlock 502 have a transaction record buffer 506, a command queue 508, and a transaction indicator 510, and a transfer engine 512, in the embodiment shown. In further embodiments, various further components could replace or augment one or more of these components, and various further combinations are readily devised. The transaction record buffer 506 can be implemented as a linear buffer 514 or a circular buffer 516, and in one embodiment is about 64 KB (kilobytes) long. In some embodiments, the transaction record buffer 506 is implemented in a portion of the non-persistent memory 404, or in memory resident in the controller 212. Logical records 504 or payloads arriving at the transaction engine 402 (e.g., from the controller 212 of the storage unit 152) are written into the transaction record buffer 506, for example in serial order (although further embodiments could have these written in parallel into a transaction record buffer 506). As an illustration, a logical record could include hundreds or thousands of bytes of data, and the transaction record buffer 506 is preferably long enough to hold many logical records (i.e., not just one or two). At a very minimum, the transaction record buffer should be at least one hundred bytes long in some embodiments.

The command queue 508 holds a description of a transfer of a logical record 504. In one embodiment, the command queue 508 is a data structure that holds a sequence number 518 corresponding to the logical record 504, an origin 520 of the logical record 504, a destination 522 of the logical record 504, and a size 524 of the logical record 504. For example, the command queue 508 could be implemented in a portion of the non-persistent memory 404, or in memory or a register resident in the controller 212, etc. The transaction indicator 510 is a data structure that holds pointers to the transaction record buffer 506 in some embodiments. An end pointer 526 points to the end of the logical record(s) in the transaction record buffer 506, i.e., points to the end of the last logical record 504 written into the transaction record buffer 506 at any given time. A start pointer 528 points to the beginning of the next logical record 504 to be transferred out of the transaction record buffer 506. In some embodiments, a transfer engine 512 coordinates transfers of logical records 504 from the transaction record buffer 506 to the nonpersistent memory 404 once one or more descriptions of transfers of logical records are written to the command queue 508 (e.g., by the controller 212 of the storage unit 152). Various implementations are possible for a transfer engine 512, which could be a state machine, hardwired or implemented in software or firmware, or could be software code executing on a processor such as the controller 212, etc. The above components cooperate as the transaction interlock 502 and the transaction engine 402. In one embodiment, the transaction interlock 502 includes the transaction record buffer 506, the command queue 508 and the transaction indicator 510. In some embodiments, the transfer engine 512 couples to the DMA unit 214, and employs the DMA unit 214 to transfer logical records 504.

Still referring to FIGS. 4 and 5, an atomic update, in the context of the transaction engine 402, is a transfer of an entire logical record 504 from the transaction record buffer 506 to the non-persistent memory 404, as performed by the transfer engine 512 (via the DMA unit 214, in some embodiments). Logical records 504 are handled along the way by the controller 212 of the storage unit 152, which receives logical records 504 from one or more storage nodes 150 of the storage cluster 160. To begin a process of storing logical record(s) 504, also referred to as inserting a payload, one or more storage nodes 150 assign a sequence number to each logical record 504 and determine a set of devices, namely storage units 152 to which to transmit the logical records 504. The payloads are transmitted, i.e., logical records 504 are sent to storage units 152, with the intent or goal of copying the logical records into a set of addresses in volatile memory, e.g., non-persistent memory 404, which can occur outside of any interlock. The controller 212 of a storage unit 152 receiving such a payload forms a logical record 504 corresponding to the data written into the non-persistent memory 404 between a starting record address and an ending record address. Among other information, the logical record 504 may contain the assigned sequence number. The controller 212 copies the logical record 504 into the transaction record buffer 506, using as many words (or bytes, etc.) and bus transfers as appropriate to complete this copy. Essentially, the transaction record buffer 506 is used as an intermediary device, which the controller 212 writes into and which interacts with the transaction interlock 502. The transaction engine 402 uses the transaction record buffer 506 as an input. Next, the controller 212 writes to the command queue 508, which is also an input to the transaction engine 402. The controller 212 writes the end pointer 526 of the transaction record buffer 506. Once the controller 212 finishes writing all of the words to a logical record 504 (e.g., hundreds, thousands, tens of thousands of words, etc.), the controller 212 makes this single, final (for that atomic transfer) write to the command queue 508, as a second time point. The above actions and information constitute the controller 212 programming and triggering the transaction engine 402. With the transaction record buffer 506 and the command queue 508 as inputs to the transaction engine 402, the transaction interlock 502 is now equipped to perform the atomic update as an interlocked transaction. The transaction engine 402 has retained the previous time point (i.e., the previous time the second time point was written) from the last atomic update, and applies this as a first time point for the current atomic update. The transaction engine 402 interprets the writing of the second time point as a trigger to copy the entire logical record 504, which is the data from the first time point to the second time point in the transaction record buffer 506, to the non-persistent memory 404 in some embodiments. Applying the first time point for the start pointer 528, and the second time point for the end pointer 526, the transaction engine 402 now copies the logical record 504, including the sequence number 518, the origin 520, the destination 522, and the size 524, from the transaction record buffer 506 to the non-persistent memory 404. When this transfer is complete, the transfer engine 512 retains the second time point as a first time point (e.g., start pointer 528) for the next atomic transfer, pointing to the next logical record 504 in the transaction buffer 506. The transfer engine 512 repeats the above actions for the next atomic transfer, immediately if the next time point is available, or later when the next time point arrives.

With this mechanism, the information in the transaction record buffer (any logical records 504 waiting for transfer), the command queue 508 (the description of the most recent transfer), the transaction indicator 510 (pointing to beginning and end of logical records 504 awaiting transfer) and the non-persistent memory 404 (which includes the complete logical record 504 most recently transferred) is consistent and coherent. This process repeats with each next atomic update and transaction. Writing the description of the transfer to the command queue 508 constitutes a transaction commit, since the atomic update (i.e., the transfer of the logical record 504 from the transaction record buffer 506 to the non-persistent memory 404) is guaranteed by the system to occur (or to have occurred). The command queue 508 has a fully formed command, which the transaction engine 402 with transaction interlock 502 can act on to transfer the logical record 504, between the first time point and the second time point, in a guaranteed, interlocked manner. The system is further guaranteeing that, even in the case of power loss or a crash, a coherent image of this atomic update (the one for which the transaction commit is made) will be available in the persistent memory 406 for use during recovery.

Figure 6:
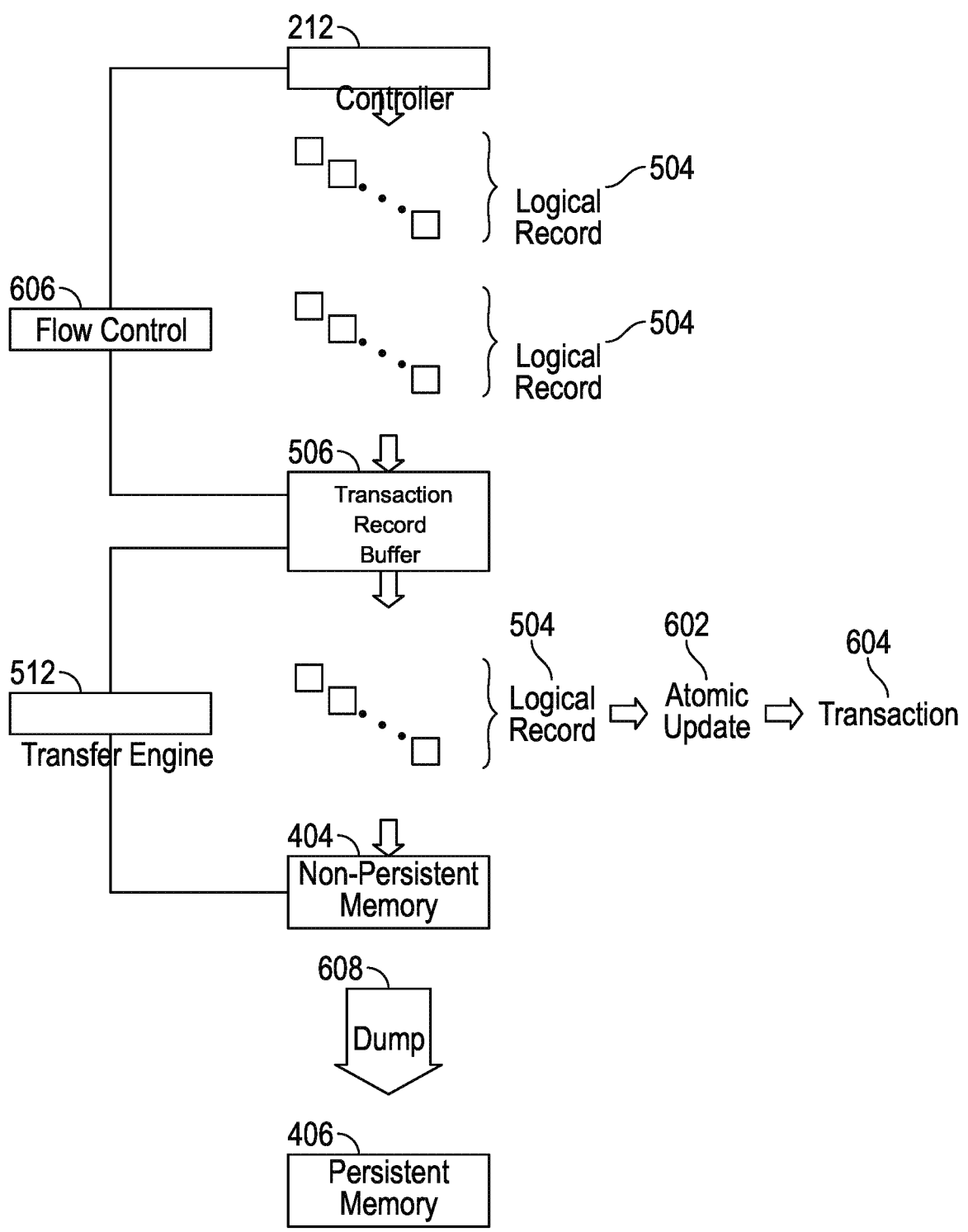
FIG. 6 is an action diagram showing flow control applied to logical records arriving at the transaction record buffer, and the transfer engine applied to an atomic update as a transaction in which a logical record is transferred from the transaction record buffer to non-persistent memory.

FIG. 6 is an action diagram showing flow control 606 applied to logical records 504 arriving at the transaction record buffer 506, and the transfer engine 512 applied to an atomic update 602 as a transaction 604 in which a logical record 504 is transferred from the transaction record buffer 506 to non-persistent memory 404. With reference back to FIG. 3, a storage node 150 is passing (i.e., sending) logical records 504 to one of the storage units 152, and (continuing with FIG. 6) the controller 212 of the storage unit 152 is sending the logical records 504 to the transaction record buffer 506. This is moderated by a flow control unit 606, which updates the end pointer 526 (see FIG. 5) of the transaction indicator 510 as logical records 504 are loaded into the transaction record buffer 506. In this manner, the end pointer 526 tracks the end of the last logical record 504 that was written into the transaction record buffer 506. The flow control unit 606 operates to prevent new logical records 504 from overwriting existing logical records 504 in the transaction record buffer 506. In FIG. 6, the logical records 504 are shown broken into portions, which is symbolic of the transfer rate and bus width between the controller 212 and the transaction record buffer 506. Generally, the width of this bus is determined by the bus width of the controller 212, and the length of a logical record 504 is greater than this bus width.

The transfer engine 512 moderates transfers of logical records 504 from the transaction record buffer 506 to the non-persistent memory 404, as described above with reference to FIGS. 4 and 5. Each logical record 504 so transferred is an atomic update 602 and is according to a transaction 604 as tracked, committed and interlocked by the transfer engine 512 in cooperation with the transaction interlock 502. The logical records 504 are shown broken into portions between the transaction record buffer 506 and the non-persistent memory 404, which is symbolic of the transfer rate and bus width between the transaction record buffer 506 and the non-persistent memory 404. In some embodiments, this bus width is wider than the bus width of the controller 212, which results in improved throughput.

A dump 608 (e.g., a copy or transfer) of the contents of non-persistent memory 404 to persistent memory 406 is illustrated in FIG. 6. This dump 608 could occur (e.g., be triggered) in response to an event, such as power loss, or crash of an operating system or application. In the embodiment shown, the transfer engine 512 waits until after completion of an atomic update 602, then performs the dump 608. In this manner, the persistent memory 406 then has a coherent image of the most recent atomic update 602 (and other atomic updates 602 preceding it). There is no possibility of a partial completion of an atomic update, no possibility of a portion of the atomic update disappearing, no possibility of information stating that the atomic update has completed when in fact it has not, and no possibility that there is only partial duplication of the atomic update into the persistent memory 406. The system can rely on this capability during recovery, after power has been restored, the operating system is rebooted or the application is restarted, so that data is recoverable and is not corrupted.

FIG. 7 is a flow diagram of a method for a transactional commit in a storage unit, which can be practiced on or using embodiments of the storage unit of FIGS. 4-6. In various embodiments, the method can be practiced by a processor of the storage unit, and/or by components of the storage unit. In some embodiments, the method may be practiced by a processor of the storage node, and/or by components of the storage node. In an action 702, one or more logical records are received into the transaction engine, with transaction interlock. For example, logical records can be received into the transaction record buffer. In an action 703, an indication to perform an atomic transfer is received into the command queue of the transaction engine. This could be the time point which is sent by the controller of the storage unit, which is applied by the transaction engine to update the end pointer of the transaction indicator, and which acts to trigger the atomic update as an interlocked transaction. The start pointer of the transaction indicator can be set to point to the beginning of the next logical record to be transferred out of the transaction record buffer, for example by applying the previous time point. In an action 704, a logical record is transferred from the transaction engine to non-persistent memory as an atomic update moderated by the transaction interlock. It should be appreciated that this transfer is an atomic update. In an action 706, the transaction interlock is updated. Updating the command queue upon completion of the transfer is part of the interlock update, in some embodiments. Updating the start pointer of the transaction indicator, to point to the next logical record to be transferred, is part of the interlock update, in some embodiments.

In a decision action 708, it is determined whether there is an event. The event could be loss of power (although an energy reserve supports completion of various operations, in some embodiments). The event could be an operating system crash (although the storage unit has a dedicated processor and software that is not affected by an operating system crash, in some embodiments). The event could be an application crash (although the storage unit has a dedicated processor and software that is not affected by an application crash, in some embodiments). The event may be any suitable event impacting data coherency mechanisms. If there is no event, flow branches back to the action 704, to transfer another logical record, or back to the action 702 to receive more logical records. If there is an event, flow advances to the decision action 710.

In the decision action 710, it is determined whether there is an atomic update in progress. If there is an atomic update flow branches to the action 712, to complete the atomic update. Flow then proceeds to the action 714. If there is not an atomic update, flow branches to the action 714. In the action 714, the non-persistent memory is dumped to the persistent memory. In other words, contents of the non-persistent memory are copied or transferred to the persistent memory. Because of the transaction interlock, and the completion of any atomic update that is in progress when the event occurs, the dump results in the persistent memory having a coherent image (i.e., uncorrupted) of the most recent atomic update, and other updates preceding it.

Figure 8:
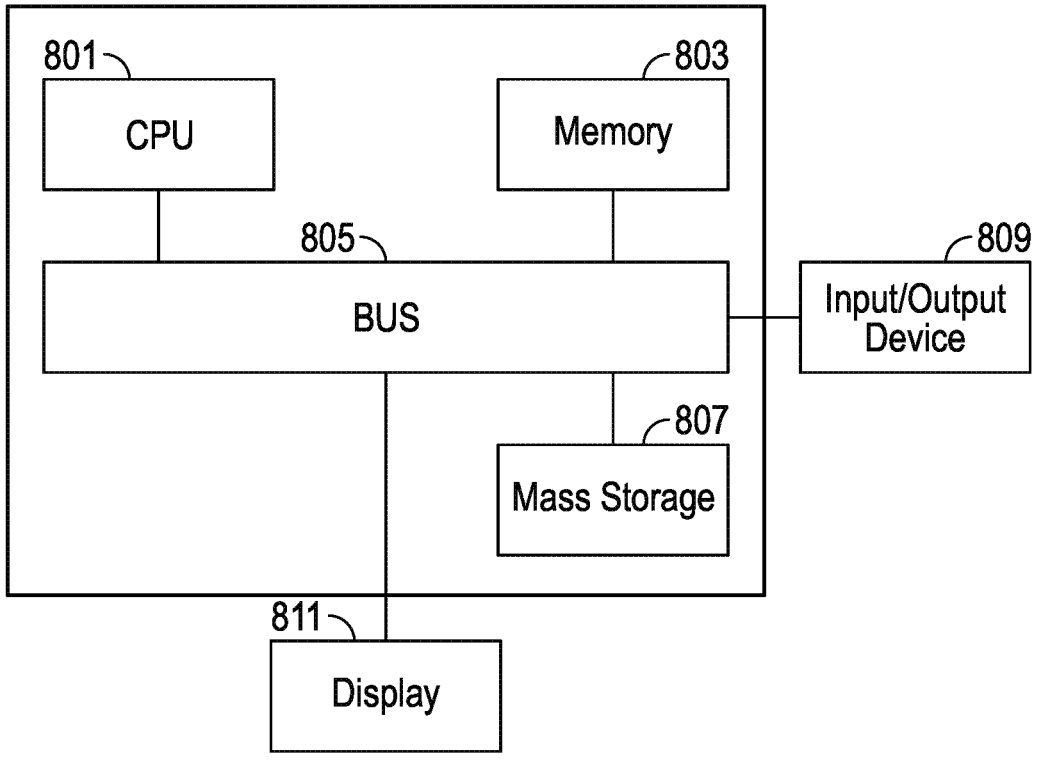
FIG. 8 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 8 is an illustration showing an exemplary computing device which may implement the embodiments described herein. The computing device of FIG. 8 may be used to perform embodiments of the functionality for a storage node or a non-volatile solid state storage unit in accordance with some embodiments. The computing device includes a central processing unit (CPU) 801, which is coupled through a bus 805 to a memory 803, and mass storage device 807. Mass storage device 807 represents a persistent data storage device such as a disc drive, which may be local or remote in some embodiments. The mass storage device 807 could implement a backup storage, in some embodiments. Memory 803 may include read only memory, random access memory, etc. Applications resident on the computing device may be stored on or accessed via a computer readable medium such as memory 803 or mass storage device 807 in some embodiments. Applications may also be in the form of modulated electronic signals modulated accessed via a network modem or other network interface of the computing device. It should be appreciated that CPU 801 may be embodied in a general-purpose processor, a special purpose processor, or a specially programmed logic device in some embodiments.

Display 811 is in communication with CPU 801, memory 803, and mass storage device 807, through bus 805. Display 811 is configured to display any visualization tools or reports associated with the system described herein. Input/output device 809 is coupled to bus 505 in order to communicate information in command selections to CPU 801. It should be appreciated that data to and from external devices may be communicated through the input/output device 809. CPU 801 can be defined to execute the functionality described herein to enable the functionality described with reference to FIGS. 1-7. The code embodying this functionality may be stored within memory 803 or mass storage device 807 for execution by a processor such as CPU 801 in some embodiments. The operating system on the computing device may be MS-WINDOWS™, UNIX™, LINUX™, iOS™, CentOS™, Android™, Redhat Linux™, z/OS™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments.

However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
    writing data into a first memory portion of solid state memory of a storage node;
    writing an indication to perform an update associated with the data into a second memory portion of the solid state memory, the indication comprising one or more pointers to the data in the first memory portion, wherein the writing the data and the writing the indication are managed by a processing device of the storage node;
    performing the update; and
    writing an image of the data to persistent solid state memory of the storage node upon a determination that the update is complete.

2. The method of claim 1, wherein one of a power loss, an operating system crash, or a software process crash triggers the writing the image of the data.

3. The method of claim 1, wherein writing the indication comprises writing to a queue of the second memory portion a timestamp indicating portions of the data have been written to the first memory.

4. The method of claim 1, wherein writing the image is supported by an energy reserve.

5. The method of claim 1, wherein the first memory portion and the second memory portion are non-persistent memory.

6. The method of claim 1, wherein writing the indication comprises:
    writing a description of a transaction to the second memory, wherein the description of the transaction includes a sequence number and wherein writing the description of the transaction to the second memory records a transactional commit characterized by transferring an entirety of the data to the first memory.

7. The method of claim 1, wherein the first memory portion, the second memory portion, and the persistent memory are within a solid state storage device of the storage node, and wherein a plurality of storage nodes are operatively coupled together.

8. A non-transitory computer readable storage medium comprising instructions that, when executed by a processing device, cause the processing device of a storage node to:
    write data into a first memory portion of solid state memory of the storage node;
    write an indication to perform an update associated with the data into a second memory portion of the solid state memory, the indication comprising one or more pointers to the data in the first memory portion;
    perform the update; and
    write an image of the data to persistent solid state memory of the storage node upon a determination that the update is complete.

9. The non-transitory computer readable storage medium of claim 8, wherein one of a power loss, an operating system crash, or a software process crash triggers the writing the image of the data.

10. The non-transitory computer readable storage medium of claim 8, wherein writing the indication comprises writing to a queue of the second memory portion a timestamp indicating portions of the data have been written to the first memory.

11. The non-transitory computer readable storage medium of claim 8, wherein writing the image is supported by an energy reserve.

12. The non-transitory computer readable storage medium of claim 8, wherein the first memory portion and the second memory portion are non-persistent memory.

13. The non-transitory computer readable storage medium of claim 8, wherein writing the indication comprises:

writing a description of a transaction to the second memory, wherein the description of the transaction includes a sequence number and wherein writing the description of the transaction to the second memory records a transactional commit characterized by transferring an entirety of the data to the first memory.

14. The non-transitory computer readable storage medium of claim 8, wherein the first memory portion, the second memory portion, and the persistent memory are within a solid state storage device of the storage node, and wherein a plurality of storage nodes are operatively coupled together.

15. A storage system, comprising:

a plurality of storage nodes coupled together, at least one of the plurality of storge nodes comprising non-persistent solid state memory and persistent solid state memory; and

a processing device of the at least one of the plurality of storge nodes, operatively coupled to the non-persistent solid state memory and the persistent memory, the processing device configured to:

write data into a first memory portion of solid state memory of the storage node;

write an indication to perform an update associated with the data into a second memory portion of the solid state memory, the indication comprising one or more pointers to the data in the first memory portion;

performing the update; and write an image of the data to persistent solid state memory of the storage node upon a determination that the update is complete.

16. The storage system of claim 15, wherein one of a power loss, an operating system crash, or a software process crash triggers the writing the image of the data.

17. The storage system of claim 15, wherein writing the indication comprises writing to a queue of the second memory portion a timestamp indicating portions of the data have been written to the first memory.

18. The storage system of claim 15, wherein writing the image is supported by an energy reserve.

19. The storage system of claim 15, wherein the first memory portion and the second memory portion are non-persistent memory.

20. The storage system of claim 15, wherein the first memory portion, the second memory portion, and the persistent memory are within a solid state storage device of the storage node, and wherein a plurality of storage nodes are operatively coupled together.

* * * * *